United States Patent [19]

Shimizu

[11] Patent Number: 4,573,083
[45] Date of Patent: Feb. 25, 1986

[54] IMAGE TRANSMISSION SYSTEM

[75] Inventor: Katsuichi Shimizu, Kunitachi, Japan

[73] Assignee: Canon Kabushiki Kaisha, Tokyo, Japan

[21] Appl. No.: 458,950

[22] Filed: Jan. 18, 1983

[30] Foreign Application Priority Data

| Jan. 25, 1982 | [JP] | Japan | 57-9851 |
| Jan. 25, 1982 | [JP] | Japan | 57-9852 |
| Jan. 25, 1982 | [JP] | Japan | 57-9853 |
| Jan. 25, 1982 | [JP] | Japan | 57-9854 |
| Jan. 25, 1982 | [JP] | Japan | 57-9855 |
| Jan. 25, 1982 | [JP] | Japan | 57-9856 |
| Jan. 25, 1982 | [JP] | Japan | 57-9857 |
| Jan. 25, 1982 | [JP] | Japan | 57-9858 |
| Jan. 25, 1982 | [JP] | Japan | 57-9859 |
| Jan. 25, 1982 | [JP] | Japan | 57-9860 |

[51] Int. Cl.⁴ .................................. H04N 1/32
[52] U.S. Cl. ..................... 358/257; 340/825.52
[58] Field of Search ....................... 358/256, 257; 340/825.5, 825.51, 825.52

[56] References Cited

U.S. PATENT DOCUMENTS 3,958,088  5/1976  Vieri ........................ 358/257

Primary Examiner—Edward L. Coles, Sr.
Attorney, Agent, or Firm—Fitzpatrick, Cella, Harper & Scinto

[57] ABSTRACT

There is disclosed an image transmission system capable of providing efficient image transmission. The image transmission system has a relaying unit provided with plural input lines and plural output lines and adapted to transmit signals entered from the input lines to one or more selected output lines, a memory system connected to the relaying unit for storing image information, one or more image information output units respectively connected to the input lines, and one or more image recording units respectively connected to the output lines.

23 Claims, 21 Drawing Figures

FIG. 10

(1) COMMAND TYPE 1 | REQUEST | XMTG REQUEST / RECEIVING REQUEST (2) COMMAND TYPE 2 | DESTINATION | THE NUMBER OF SHEETS TO BE TRANSMITTED | SIZE | SECRET TREATMENT | CONTINUOUS PACKET EXISTS (3) COMMAND TYPE 3 | THE NUMBER OF SHEETS TO BE TRANSMITTED | SIZE | WAITING TIME WHEN NOT READY | RECEIVABLE? | STAND-BY OK? | RECEIVED? | RESPONSE YES/NO (4) COMMAND TYPE 4 | HISTORY | FILE NO | RECEIVING SHEET NO

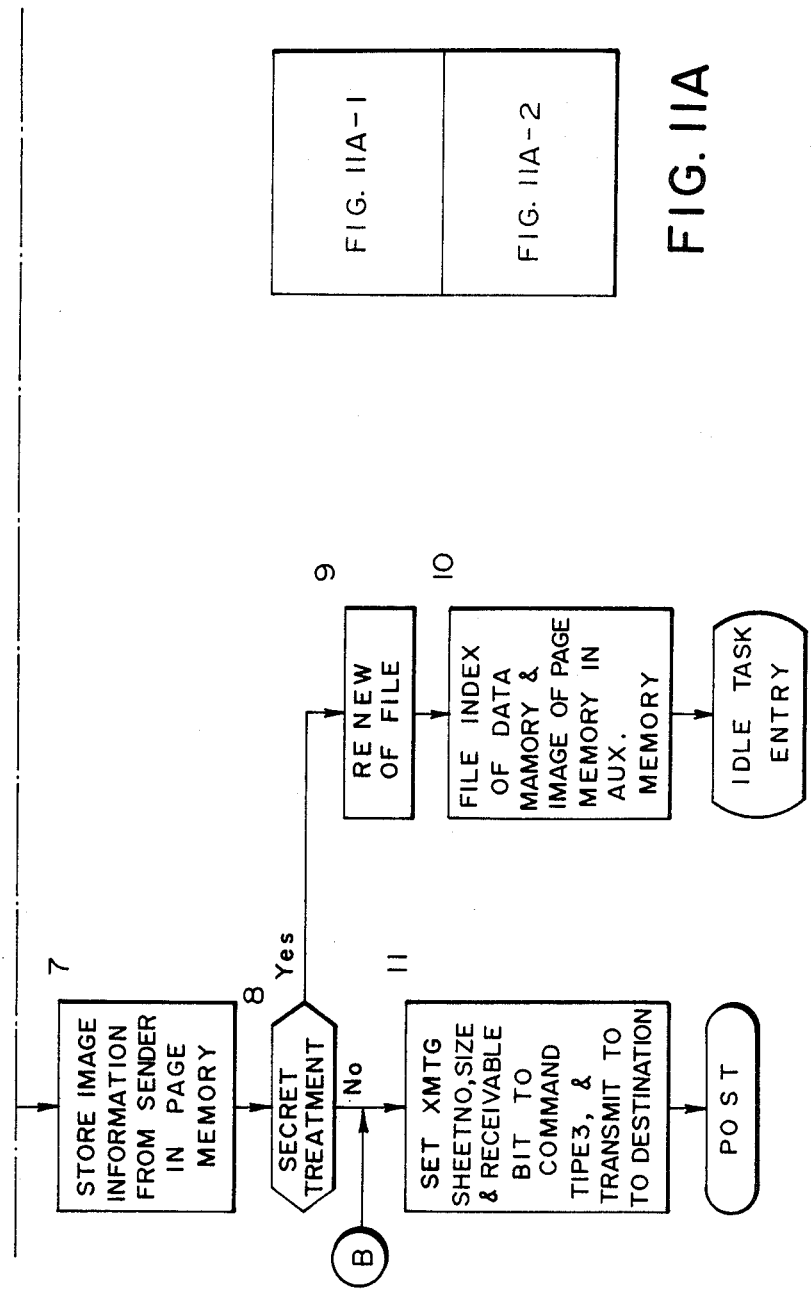

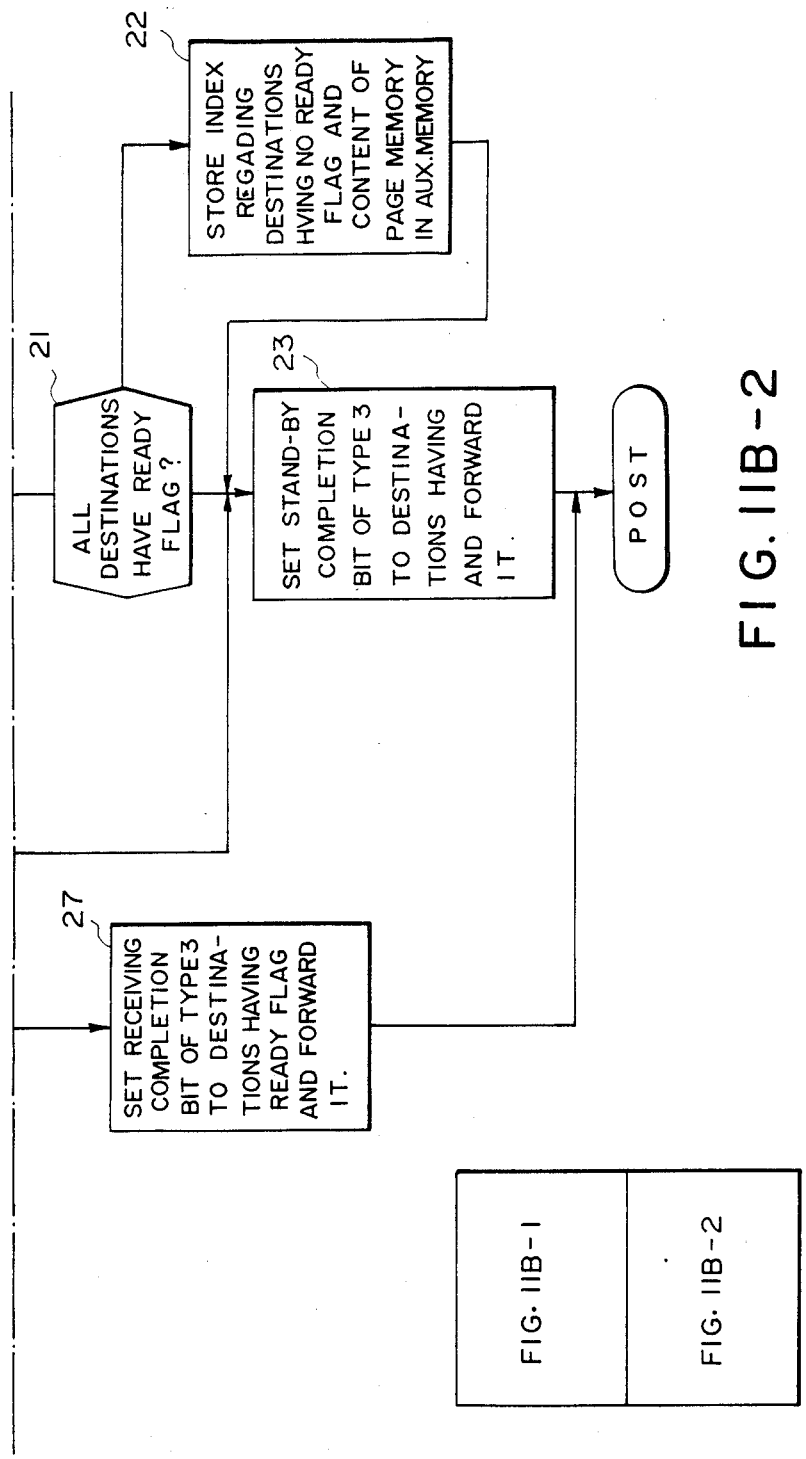

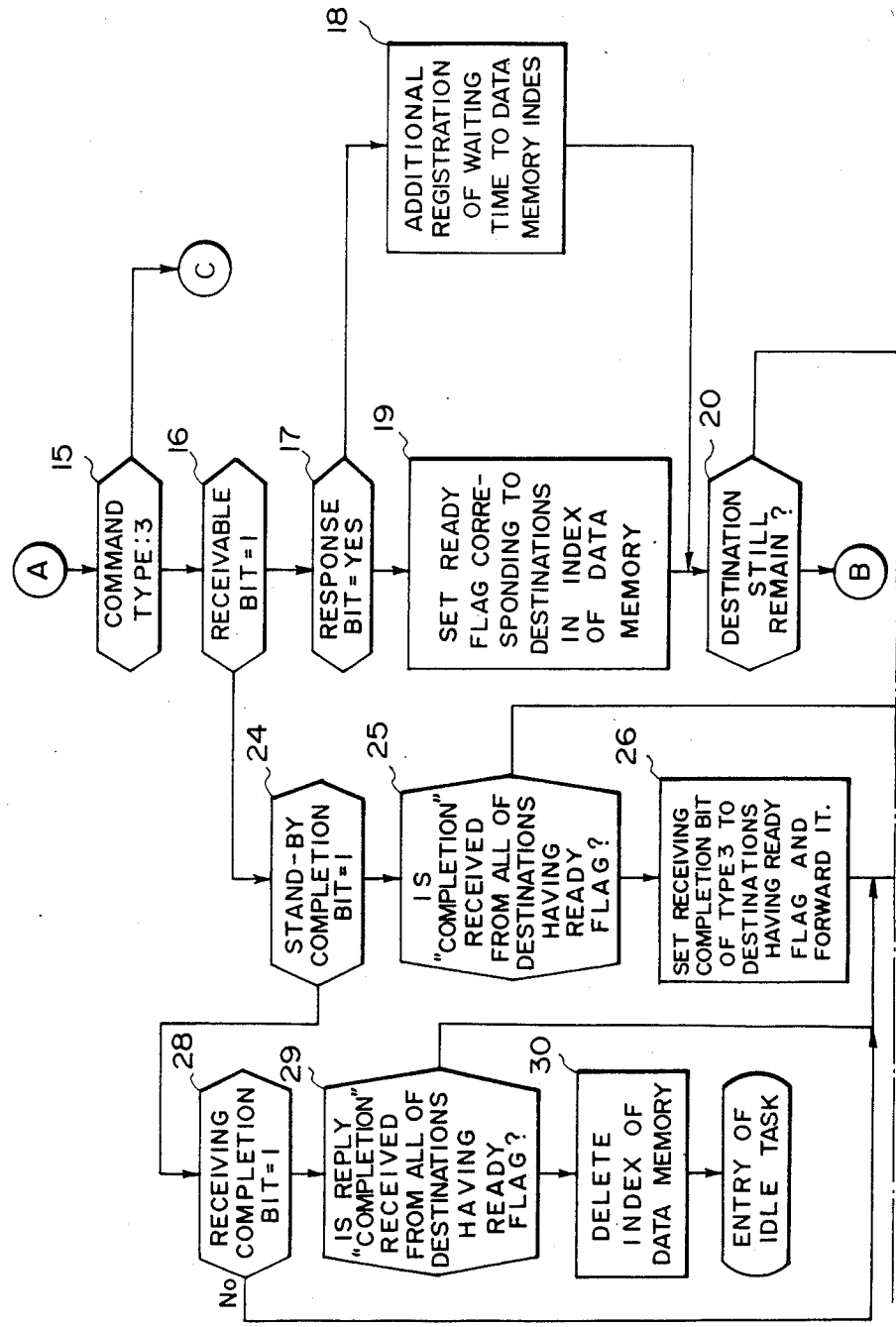
FIG. IIB-1

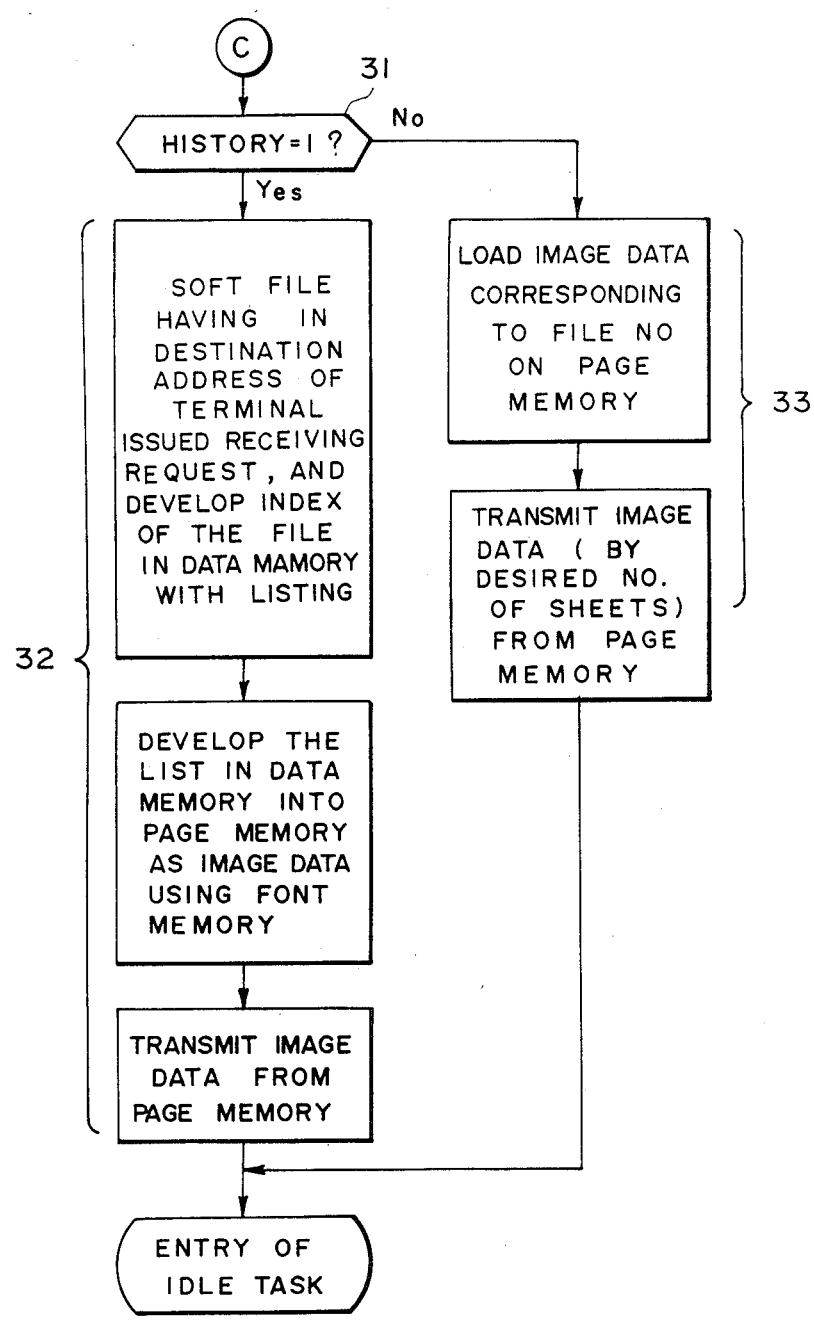
FIG. IIC

| FILE-NO | ORIGINATOR | SECRET | ISSUED TIME | SIZE |
|---|---|---|---|---|
| 15 | 1452 | * | 81-5-11 | A4 |
| 19 | 1450 | * | 81-5-12 | A4 |
| 29 | 1450 | * | 81-5-12 | A4 |
| --- | --- | --- | --- | --- |

F I G. 15

IMAGE TRANSMISSION SYSTEM

BACKGROUND OF THE INVENTION

1. Field of the Invention

The present invention relates to an image transmission system for transmitting and receiving image information.

2. Description of the Prior Art

As a system for transmitting image information between distant locations, there is already known a facsimile apparatus utilizing telephone lines.

Such known facsimile is however not yet satisfactory with respect to the resolving power or transmission speed. Also such facsimile is not adequate in terms of the installation and maintenance costs in order to respond to a requirement of image transmission within a limited area, such as within a determined building site.

Also an apparatus for receiving image information and reproducing an image, for example a printer, is usually shared by several persons because it is generally expensive and requires a relatively large space for installation, so that the transmitted information may be received regardless of the will of the addressee through the operation of another person even when the addressee is absent. Such unwanted transmission of the information can naturally be avoided if the transmission is effected only when the addressee is present, but for this purpose the sender of the information has to confirm the presence of the addressee at least once.

In an image transmission system with plural transmitting units, image transmission from a first unit to a second unit is effected only after a command signal emitted by the first unit is confirmed by the second unit. In such image transmission system, there may occur collision of information in the system in the case that demands for transmission are simultaneously emitted from plural units or in case a demand for transmission is emitted while image transmission is already going between other units of the system. In order to avoid such collision it has been necessary, therefore, to give priority ranking to the units or to circulate a particular signal, indicating that the transmission of information is under way, in the system.

Also such system is constructed in such a manner await the completion of reception, if an addressee unit is in the course of receiving image information from another unit, and to initiate the new image transmission after the operator of the sending unit confirms that the receiving unit has become available for receiving the new information.

Thus, the image transmission is apparently impossible if the receiving unit is not available for reception, even if the sending unit is available for sending. Stated differently, image transmission is possible only when both the sending unit and the receiving unit are available.

Also the transmission of image information from a unit to plural units may be achieved either by successively repeating transmission from a unit to each of the others in sequence or by simultaneous transmission to plural receiving units.

The former method involves a repetition of the transmission equal to the number of receiving units and consequently requires a considerable time for transmission when the number of receiving units is large.

On the other hand, in the latter method, the image transmission may be prohibited if all the units designated as addressees are not available for reception.

Also, with the progress of technology for handling image information in the form of electric signals, there have been proposed image processing apparatus incorporating two functions as copier and as facsimile.

Such apparatus with two functions usually has a priority ranking for the information to be processed so that either one function has a priority over the other. However a fixed priority ranking is often inconvenient since the priority varies according to the location of installation or to the user.

SUMMARY OF THE INVENTION

In consideration of the foregoing, an object of the present invention is to provide an image transmission system capable of efficient image transmission.

Another object of the present invention is to provide an image transmission system capable of effective image transmission within a limited area.

Still another object of the present invention is to provide an image transmission system provided with a relaying unit for selectively transmitting the image information, emitted from a sending unit, to a desired receiving unit.

Still another object of the present invention is to provide an image transmission system in which the sending unit can perform an image reading operation regardless of whether the receiving unit is available for receiving the image information.

Still another object of the present invention is to provide an image transmission system in which a relaying unit, for transmitting the image information from an image reading unit to an image recording unit, stores said image information and then transmits the thus stored image information to the recording unit in response to a demand from said recording unit, whereby the image reading unit can perform image reading operation regardless of the state of the recording unit and the transmission of image information to the recording unit is only effected in response to a demand therefrom.

Still another object of the present invention is to provide an image transmission system in which a relaying unit, for transmitting the image information from an image reading unit to an image recording unit, stores command signals relating to the image transmission, wherein, in response to a request from a recording unit, a command signal corresponding to said recording unit is transmitted thereto in order to obtain hysteresis data concerning image transmission to said recording unit thereby confirming the data for image transmission to said recording unit.

Still another object of the present invention is to provide an image transmission system capable of orderly signal transmission for image transmission without mutual collisions of the signals.

Still another object of the present invention is to provide an image transmission system capable of storing the image information to be transmitted in case a recording unit designated as addressee is not available for reception.

Still another object of the present invention is to provide an image transmission system capable of efficient image transmission by storing the image information to be transmitted in the case that a recording unit designated as addressee is not available for reception and transmitting the stored said image information from a memory means to said recording unit after the lapse of the period of unavailability as indicated by said recording unit.

Still another object of the present invention is to provide an image transmission system capable of efficient image transmission and effective utilization of memory means by effecting an image reading operation in the recording unit regardless of the state of the receiving unit, storing the obtained image information in memory means if the recording unit is not available for reception and erasing the image information in said memory means if said state of unavailability for reception continues after the lapse of a determined period.

Still another object of the present invention is to provide an image transmission system in which, in case of transmitting image information from a reading unit plural recording units, the reading unit can independently perform the image reading operation regardless of whether all the receiving units are available for reception.

Still another object of the present invention is to provide an image transmission system, in which the priority ranking of the functions, such as copying and image transmission, of a unit can be arbitrarily selected.

The foregoing and still other objects and advantages of the present invention will become fully apparent from the following description.

BRIEF DESCRIPTION OF THE DRAWINGS

FIG. 3-1 is a block diagram showing the schematic circuit structure of the reading unit shown in FIG. 2;

FIG. 3-2 is a chart showing image signals emitted by the reading unit shown in FIG. 2;

FIG. 10 is a chart showing the contents of command packets;

FIG. 15 is a view showing an example of the reception log form.

DESCRIPTION OF THE PREFERRED EMBODIMENTS

Now the present invention will be clarified in detail by the following description to be taken in conjunction with the attached drawings.

Figure 1:
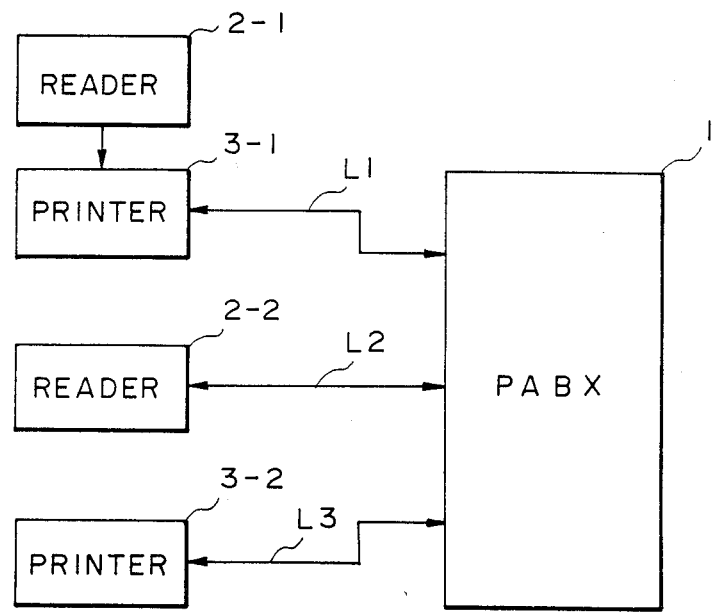
FIG. 1 is a schematic view showing the structure of the image transmission system of the present invention.

FIG. 1 schematically shows an example of the structure of the image transmission system of the present invention, wherein are provided a private automatic branch exchanger or a private branch exchanger 1 which will hereinafter represented as PABX; image reading units 2-1, 2-2 for photoelectrically reading an original image with an image sensor such as a charge-coupled device and forming corresponding electric signals; and printing units 3-1, 3-2, such as a laser beam printer, an ink jet printer or a thermal printer for image formation on a recording sheet such as paper in response to image information in the form of electric signals which will be hereinafter called image signals. The reading unit 2-1 and the printing unit 3-1 are positioned close to each other so that they also functions as a copier for image formation by the printing unit 3-1 in response to the image signals generated by the reading unit 2-1. Such function will hereinafter be called local copying.

Input-output lines L1, L2 and L3, composed for example of optical fibers, connect the PABX1 with the reading and printing units for the transmission of signals including image signals. The image transmission system shown in FIG. 1 is composed of so-called star wirings around the PABX1.

The PABX1 is provided with an exchange network, as will be explained later, for transmitting the signals entered from each input-output line selectively to another line. Also said PABX1 is internally provided with, or is connected to, a page memory composed for example of a semi-conductor random access memory (RAM) for storing image signals of a page, and an auxiliary memory composed for example of a disk memory for storing image signals of plural pages.

The image signals obtained in the reading unit 2-1 are either subjected to image formation in the printing unit 3-1 in the local copying mode, or transmitted through the line L1 to the PABX1 for storage in the page memory, or further transmitted through the line L3 to the printing unit 3-2 for image formation therein.

Also the image signals obtained in the reading unit 2-2 are either transmitted through the line L2 to the PABX and further transmitted through the line L1 to the printing unit 3-1, or transmitted to the printing unit 3-2, or stored in the page memory.

In this manner the image signals obtained in a reading unit are either transmitted to at least one of the printing units constituting the image transmission system for image formation therein, or stored in the page memory. Also the storage in the page memory may be effected simultaneously with the transmission to the printing units.

Although the PABX shown in FIG. 1 has three input-output lines, the number of lines is not limited to such a case but the system of the present invention may be constructed with at least one input line and one output line.

Figure 2:
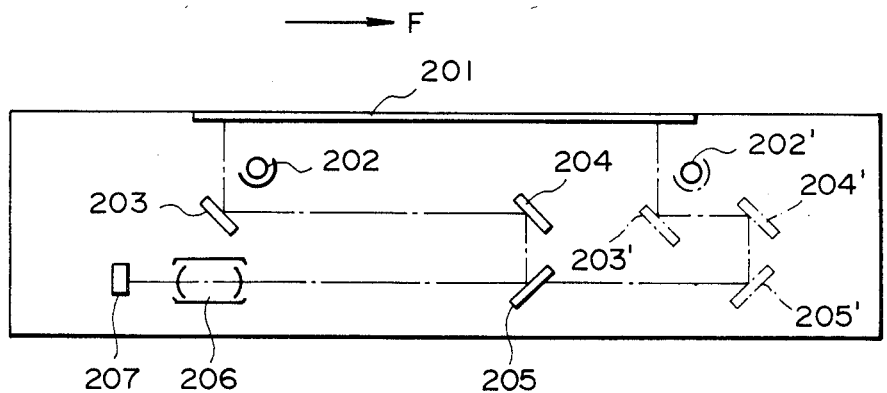
FIG. 2 is a cross-sectional view of an embodiment of the reading unit.

FIG. 2 is a cross-sectional view of an embodiment of the reading unit shown in FIG. 1, wherein are provided an original supporting glass 201; a rodshaped light source 202 such as a halogen lamp or a fluorescent lamp; a first mirror 203; a second mirror 204; a third mirror 205; a lens 206; and a solid-state linear image sensor array 207 for example composed of a charge-coupled device. In practice there are provided two sets of the lens 206 and the image sensor 207 each of which reads a half of the original image.

In the above-described reading unit, an original image placed on the supporting glass 201 is illuminated by the rod-shaped light source 202, and the reflected light is guided through the first, second and third mirrors 203, 204, 205 which are so displaced or moved as to perform subsidiary scanning operation on the original image and focused by the lens 206 onto the image sensor (CCD) 207. The main scanning direction of said CCD 207 is positioned perpendicular to the plane of the drawing. The rod-shaped light source 202 and the first mirror 203 are constructed integral by an unrepresented support member and are displaced along a direction F along unrepresented rails to perform the subsidiary scanning on the original image. The second and third mirrors 204, 205 are constructed integral by an unrepresented support member and are displaced, along unrepresented rails, in the same direction as, but with half the speed of, the first mirror 203. The rod-shaped light source 202, and first, second and third mirrors 203, 204, 205 respectively move to the broken-lined positions 202', 203', 204', 205' while maintaining a constant optical path length from the support glass 201 to the lens 206 through said mirrors 203, 204, 205.

The reading unit is designed to perform subsidiary scanning in the longitudinal direction for an original of A3 size (297×420 mm) and in a perpendicular direction for an original of A4 size (210×297 mm), with a reading line density of 16 lines/mm. Also the resolving power in the main scanning direction is 16 Pel/mm. Consequently a main scanning line provides 4752 output bits, and the number of the main scanning lines is 6720 in the A3 size or 3360 in the A4 size.

As explained in the foregoing, there are provided two sets of the lens 206 and the CCD 207 for photoelectric conversion of the original image, each of which shares approximately one-half of the image reading of said 4752 bits in the main scanning direction. The two series of image signals obtained from two CCD's 207 are synthesized by a circuit shown in FIG. 3-1 into a series of image signals corresponding to a main scanning line.

Figures 1, 3:
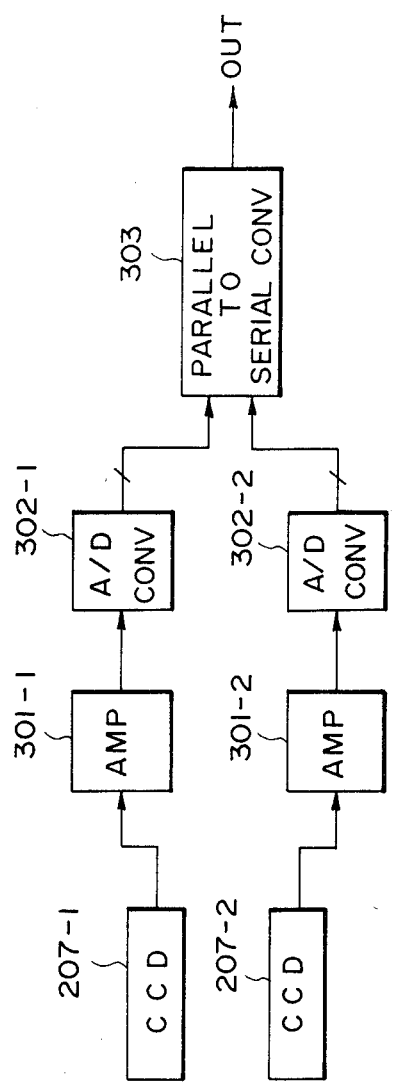
Figures 2, 3:
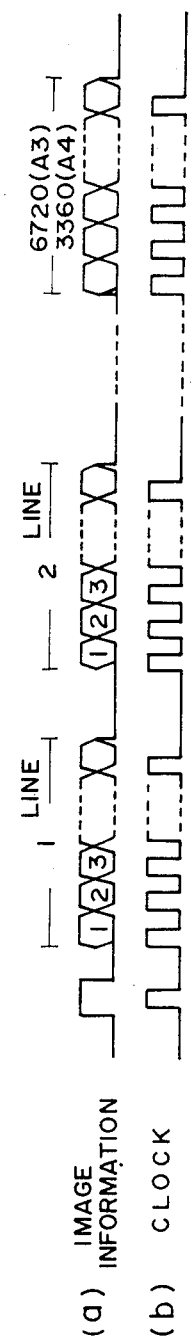

In FIG. 3-1, two CCD's 207-1, 207-2 correspond to those already explained before. Video amplifiers 301-1, 301-2 respectively perform DC amplification of the output voltages of said CCD's 207-1, 207-2 to the necessary levels. A/D converters 302-1, 302-2 perform sampling of the analog image signals in synchronization with unrepresented clock pulses to convert said signals into digital signals. A parallel-to-serial converter 303 synthesizes two series of output signals from the A/D converters 302-1, 302-2 into unified serial signals as shown in FIG. 3-2 and emits said signals from an output terminal OUT.

As shown in FIG. 3-2, there are generated clock signals (b) synchronized with the image signals (a). The image signals (a) vary at the leading ends of the clock signals (b), which terminate at the intermediate stable points of the image signals (a). The image signals covering the entier original, containing 3360 main scanning lines in the A4 size original or 6720 main scanning lines in the A3 size original are collectively called an image packet. At the start of said image packet there is provided dummy clock signals DCK serving as an identification signal and indicating, to the PABX1 and to each terminal unit, whether the following signals are image signals or command signals relating to the transmission of image signals.

Figure 4:
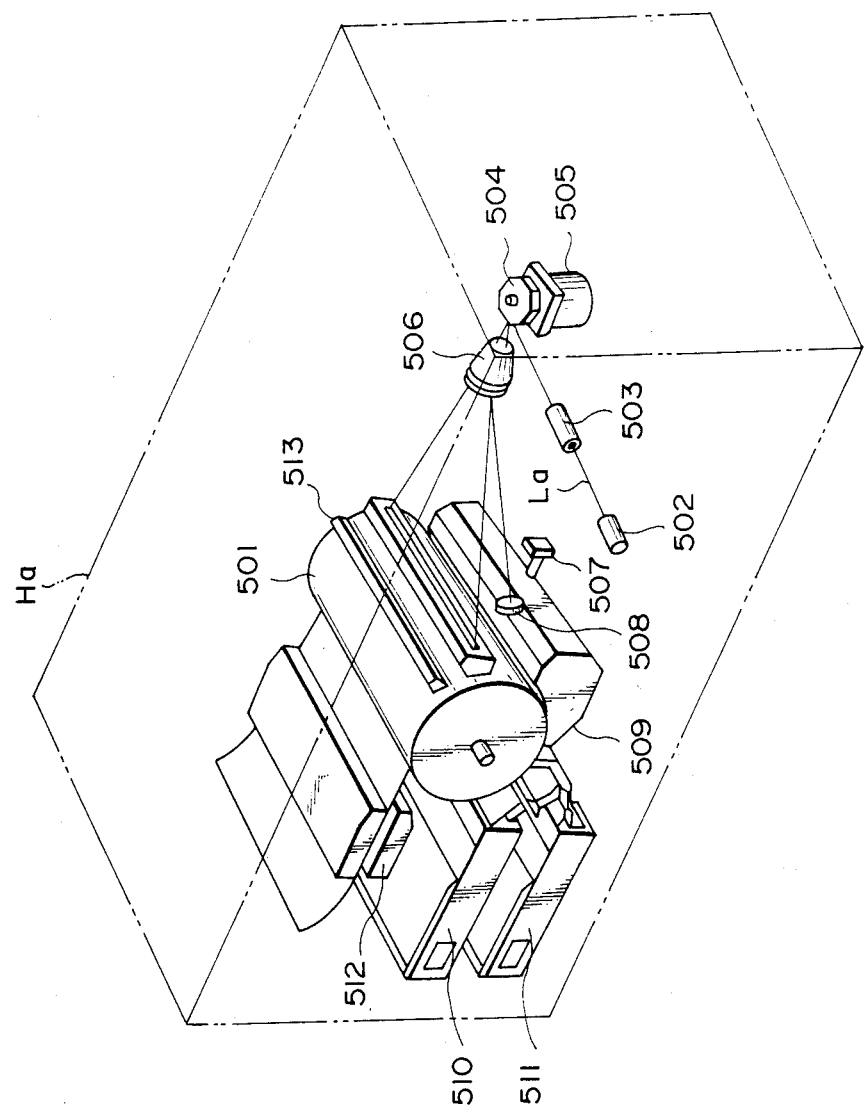
FIG. 4 is a cross-sectional view of an embodiment of the printing unit.

FIG. 4 shows, in a perspective view, an embodiment of the printing unit shown in FIG. 1.

Said printing unit employs an electrophotographic process with a laser beam. A photosensitive drum 501 is rotatably supported in a housing Ha. A semi-conductor laser 502 emits a laser beam La, which is expanded to a beam of a determined diameter through a beam expander 503 and further guided to a polygonal mirror 504 which is provided with plural mirror faces and is rotated at a determined speed by a constant-speed motor 505. The laser beam emerging from said polygonal mirror 504 is put into a substantially horizontal scanning motion, and is focused, by a lens 506 with an f-θ characteristic, as a spot on the photosensitive drum 501 previously charged into a determined polarity by a charger 513.

A beam detector 507 detects the laser beam reflected by a mirror 508 and generates a detection signal for determining the timing of modulation of the semi-conductor laser 502 to provide the photosensitive drum 501 with the desired optical information.

The laser beam performing scanning motion on the photosensitive drum 501 forms an electrostatic latent image thereon, which is rendered visible by a developing unit 509. The obtained visible image is transferred onto a recording sheet supplied from a cassette 510 or 511, then fixed on said sheet in a fixing unit 512 and finally ejected as a hard copy onto an unrepresented outlet.

Figure 5:
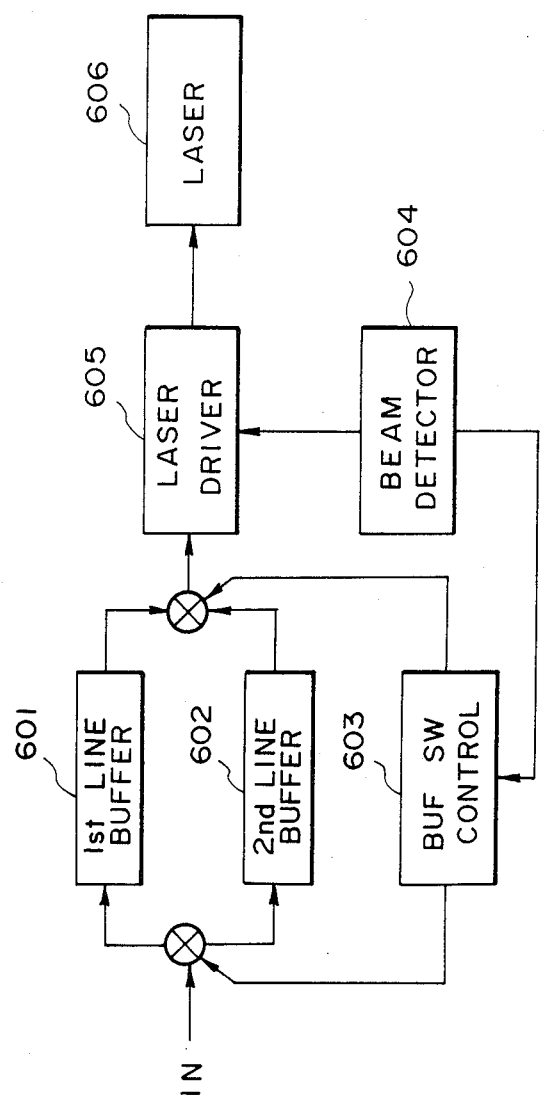
FIG. 5 is a block diagram showing the schematic circuit structure of the printing unit shown in FIG. 4.

FIG. 5 shows an example of the circuit for modulating the semiconductor laser shown in FIG. 4 with the image signals.

The image signals entered from an input terminal IN are alternately supplied, for each group of signals corresponding to a scanning line, to a first line buffer 601 and a second line buffer 602, each composed for example of a shift register of a capacity equal to the number of bits in a scanning line, under the control of a buffer switch control circuit 603.

The image signals stored in said first and second line buffers 601, 602 are alternately read, by each scanning line at a time, in response to the beam detection signal supplied from the beam detector 604 and serving as a trigger signal, and supplied to a laser driver 605.

Said laser driver 605 controls the semiconductor laser 606 according to the image signals, thus modulating the laser beam.

The circuit structure with two line buffers allows to supply the image signals stored in one of the line buffers to the laser driver 605 while the succeeding image signals are supplied to the other line buffer, thus enabling to respond to the entry of high-speed image signals.

Figure 6:
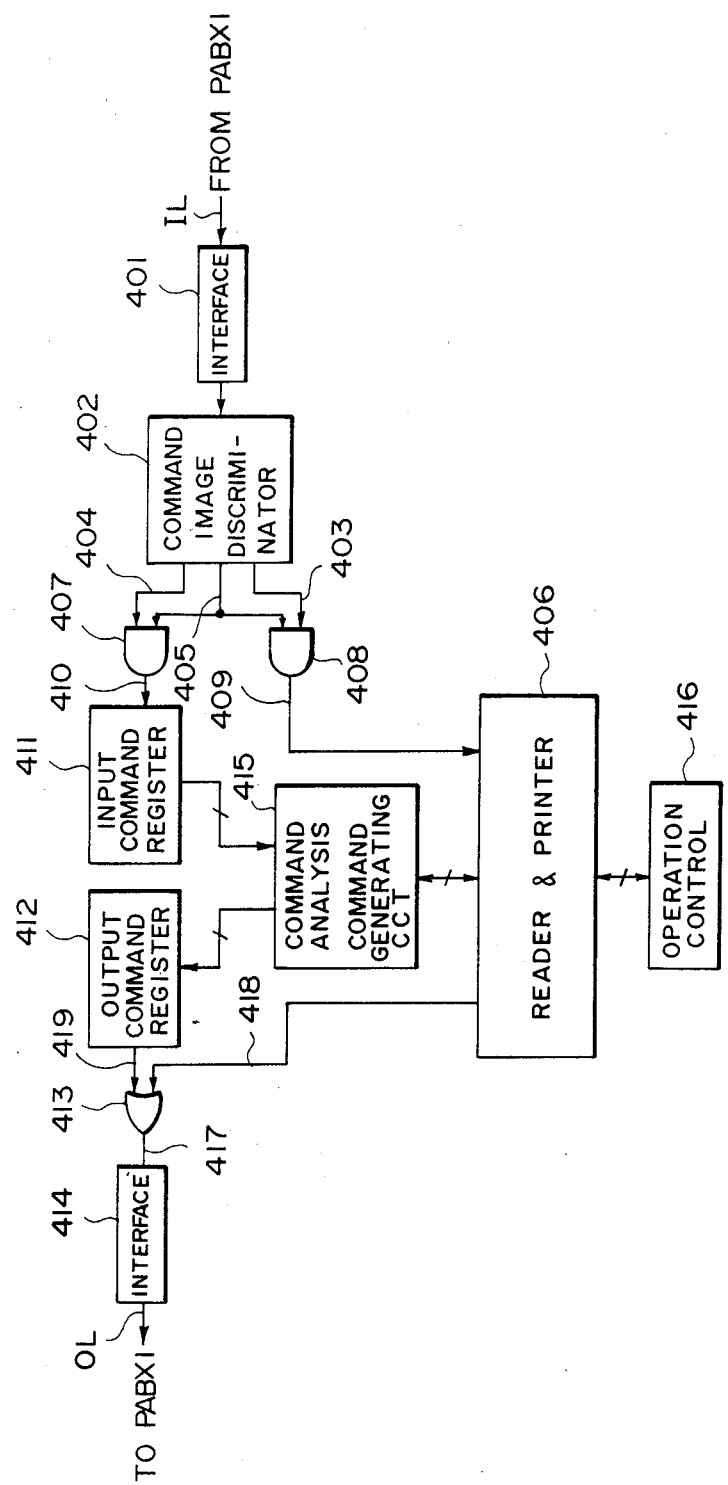
FIG. 6 is a block diagram showing the circuit structure of an embodiment of a terminal unit.

FIG. 6 is a block diagram showing an embodiment of a terminal unit incorporating the reading and printing units shown in FIGS. 2 and 4. An interface 401 receives the data entered from PABX1 provided at the input end of the terminal unit and is composed, in case an input line IL is composed of an optical fiber, of an opto-electric (O/E) converter for converting the optical signals entered from the optical fiber transmission line into electric signals. A command/image discriminator 402 identifies, by AND gating of the identification signal preceding each packet and clock signals, whether the packet entered from the interface 401 is an image packet or a command packet, and supplies a signal "1" to a line 403 or 404 respectively when the packet is an image packet or a command packet. Also the packet not containing the identification signal is supplied to a line 405. A reading and printing unit 406 performs image recording according to the entered image packet and reads the original image to form an image packet in the form of electric signals.

An AND gate 408 transmits the image packet supplied through the line 405 to a line 409 in case the signal "1" is supplied from the command/image discriminator 402 through the line 403.

Another AND gate 407 transmits the command packet supplied through the line 405 to a line 410 in case the signal "1" is supplied from the command/image discriminator 402 through the line 404.

In this manner an input packet, if it is an image packet, is supplied to the printing unit 406 through the line 409.

On the other hand, an input packet, if a command packet, is supplied through the line 410 to an input command register 411, which is composed of a serial-in-parallel-out shift register capable of storing the command packet of 32 bits. There is also provided a command analyzing and generating circuit 415.

Upon entry of the entire command packet of 2 bits into said input command register 411, said circuit receives said command packet, decodes its content, generates response bits and designation bits according to the necessity, and sets the command packet of 32 bits simultaneously in an output command register 412 composed of a parallel-in-serial-out shift register.

An OR gate 413 is connected to an output line 419 of the output command register 412 and an output line 418 for the image signals formed in the reading unit for transmission to the PABX1.

An interface 414 for transmitting the signals from terminal unit to the PABX1 is composed for example of an electro-optical (E/O) converter in case the output line OL is composed of an optical fiber, and converts the electric signals supplied through a line 417 into optical signals for transmission to the PABX1 through said optical fiber.

An operation control 416 provided in the terminal unit controls the functions of the apparatus according to the instructions concerning the transmission of the image information and for the operation of the apparatus, for example the addressee of transmission, number of transmissions, size etc., to be entered by the operator.

The terminal unit shown in FIG. 6 is provided with both printing unit and reading unit, it will be understood that a terminal unit provided with either one unit is of an approximately same structure.

Figure 7:
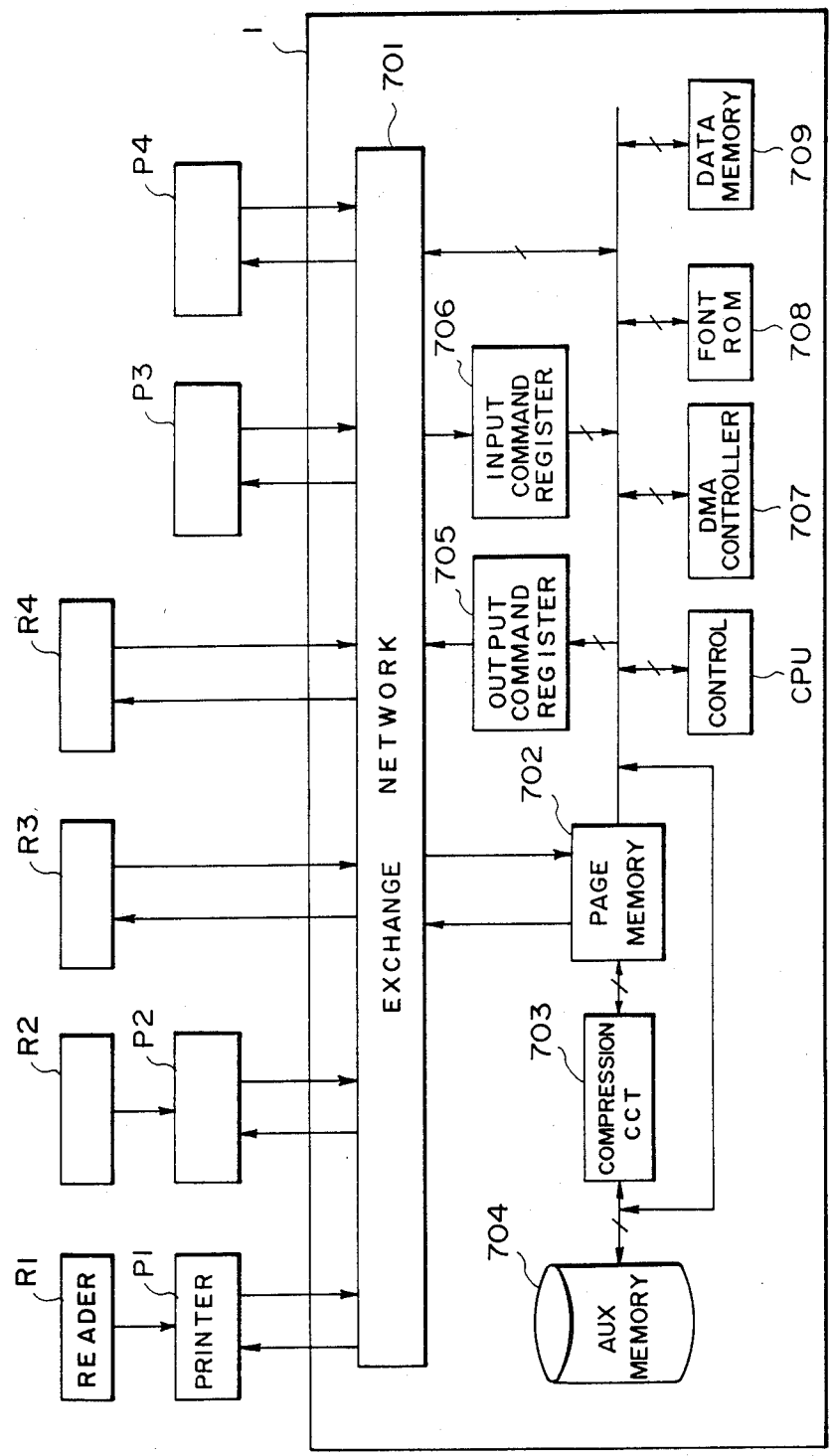
FIG. 7 is a block diagram showing the circuit structure of an embodiment of PABX shown in FIG. 1.

FIG. 7 is a block diagram showing the structure of the private automatic branch exchange PABX1 shown in FIG. 1.

In FIG. 7, there are shown a control unit or a central processing unit CPU for controlling the function of the PABX1 and of the entire image transmission system; reading units R1–R4; printing units P1–P4, wherein the reading unit R1 and the printing unit P1, or the reading unit R2 and the printing unit P2 are capable of performing the local copying function explained in the foregoing; an exchange network 701 provided with plural input lines and plural output lines and adapted to transmit the image signals and/or command signals received through one of said input lines selectively to one of said output lines according to input-output switching signals SL supplied from the control unit CPU; a page memory 702 composed of a semiconductor random access memory capable of storing the image signals of one page; an auxiliary memory 704 composed of a disk memory of a capacity of 70 MBytes for storing the image signals of plural pages; and a compression circuit 703 for compressing the image signals stored in the page memory 702 according to a determined compressing logic and sending thus compressed signals to the auxiliary memory 704.

There are also provided a parallel-in-serial-out output command register 705 adapted to receive parallel command signals concerning the transmission of image signals released from the control unit CPU and to serially transmit said signals to the printing units and reading units connected to the exchange network; and a serial-in-parallel-out input command register 706 adapted to receive serial command signals concerning the transmission of the image signals released from the reading and printing units and to transmit said command signals in parallel form to the control unit CPU.

There are further shown a DMA controller 707 for controlling the DMA transmission of the image information in the PABX1; a font read-only memory 708 for converting coded signals into image information thereby enabling to process characters in the internal processing in the form of coded signals and thus to reduce the memory capacity; and a data memory 709 for storing the command signals concerning the image transmission or the log data of image transmissions.

The number of the reading and printing units to be connected to the branch exchange PABX is regulated in consideration of the site of installation and the frequency of use. It is also possible to expand the exchange network by connecting the PABX with another PABX.

The function of the above-described circuit will be explained in the following. Image signals released from the reading units R1–R4 are supplied through the exchange network 701 and selectively stored in the page memory 702 under the control of the control unit CPU.

The signals entering said page memory 702 can be immediately released to the addressee if the reception is enabled i.e., if the appointed addressee is not busy and no other request for transmission is given from other terminal units. Otherwise said signals are stored in the auxiliary memory 704 through the compression circuit 703. At said storage in the auxiliary memory 704, the image signals are preceded by an index including log information such as a file number, sender's address, destination's address, time and date of sending etc. The exchange network 701 also has a capability of direct transmission to the addressee printing unit on real-time basis by passing the page memory 702, so that the transmission can also be made in this mode if the destination unit is ready to receive the signals synchronized with the reading operation in the sending unit.

Figure 8:
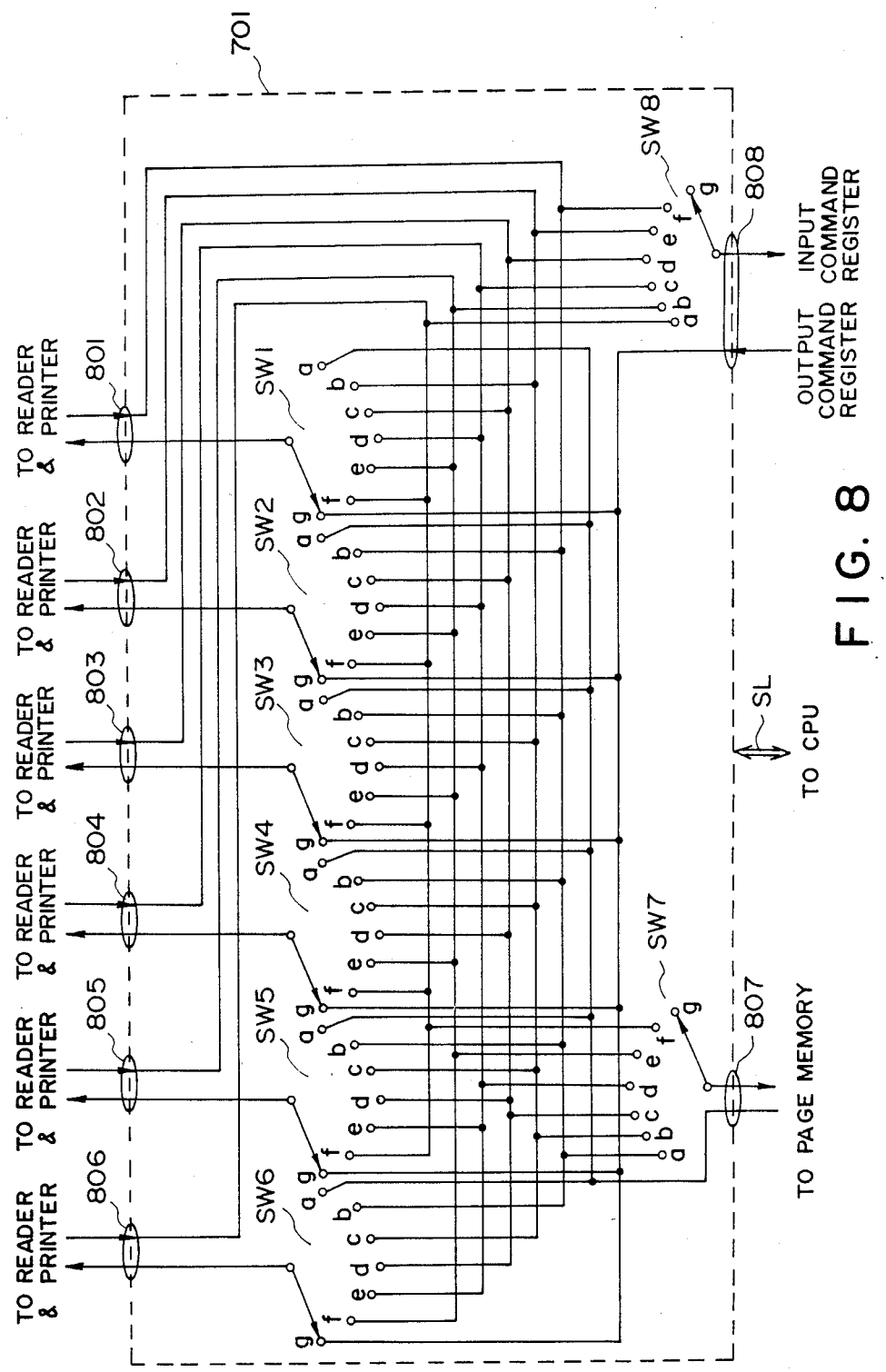
FIG. 8 is a schematic view of an exchange network shown in FIG. 7.

FIG. 8 shows the schematic structure of the exchange netword 701 shown in FIG. 7. In order to connect the reading and printing units there are provided six terminals 801–806, each of which is provided with an input line and an output line. Also there are provided terminals 807, 808 for connection with the page memory 702, output command register 705 and input command register 706 provided in the PABX1. As explained in the foregoing, said exchange network 701 is controlled by the input-output switching signals SL supplied from the control unit CPU.

Respectively corresponding to said terminals 801–806 there are provided six rotary switches SW1–SW6 respectively connected to the output lines of said terminals 801–806. Also there are provided rotary switches SW7, SW8 which are respectively connected to the output lines of the terminals 807, 808.

Input contacts a–g of each of said rotary switches SW1–SW8 are connected to the input lines of the terminals other than that corresponding to the first-mentioned rotary switch. It is to be noted, however, that the input contacts g of the rotary switches SW7, SW8 have no connection, since it is not necessary to transmit the command signals from the output command register 705 to the page memory 702, and to transmit the image signals from the page memory 702 to the input command register 706.

The rotary switches SW1–SW8 are selectively changed over in response to the input-output switching signals SL supplied from the control unit CPU.

In order to explain the function of the exchange network 701, let us consider a case in which the terminal 801 is connected to a reading unit RA while the terminals 803, 804 are connected to printing units PA, PB and the operator wishes to transmit the image information from said reading unit RA to two printing units but the printing unit PB connected to the terminal 804 is busy. In such state, the image information can be transmitted to the printing unit PA through the terminal 803 on real-time basis and can be stored once in the page memory 702 and then sent to the printing unit PB through the terminal 804 after said printing unit PB becomes no longer busy. For this purpose the rotary switches SW3 and SW7 are respectively shifted to the contacts b and a, thus supplying the image signals from the reading unit RA through the terminal 801 to the printing unit PA connected with the terminal 803 and simultaneously storing said signals in the page memory 702. Subsequently, as soon as the printing unit PB connected to the terminal 804 becomes available for reception, the rotary switch SW4 is shifted to the contact a to transmit the image signals from the page memory 702 to said printing unit PB connected with the terminal 804.

Prior to the transmission of image signals, it is necessary to exchange protocols by transmitting command packets between the PABX1 and the reading or printing unit. The output command register 705 and the input command register 706 are utilized for this purpose. As shown in FIG. 8, the input command register 706 receives the command packets from the terminal units in selective manner under the control of the rotary switch SW8. Also the output command register 705 supplies the command packet to the rotary switches SW1–SW6 for selective output of said packet from the terminals 801–806.

Figure 9:
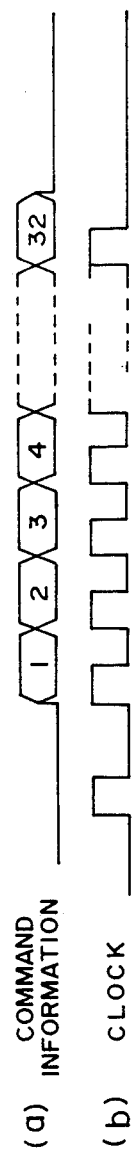
FIG. 9 is a chart showing command signals.

As shown in FIG. 9(a), said command packet is composed of signals of 32 bits which are transmitted in synchronization with clock pulses shown in FIG. 9(b). As an example, said 32 bits are allotted as shown in FIG. 10.

In the present system the reading units and the printing units are unable to send requests directly to the PABX1 but can express requests in the form of responses to the command packet entered by the PABX1. Thus, in normal state, the PABX1 at first sets the rotary switch SW1 at the contact g to transmit, from the output command register 705, a command packet for asking the presence of a request for sending or reception to a terminal unit connected to the terminal 801, and sets the rotary switch SW8 to the contact f for awaiting the response from said terminal unit. Similar command packets are subsequently released in succession from the rotary switches SW2, SW3, . . . , SW8, and the request from the terminal units is explored by repeating the above-described procedure.

The exchange operation in the branch exchange PABX can also be achieved by means of electric gates.

FIG. 10 shows various types of the command packet. There are employed four types of command packets, and the first four bits are used for indicating the types of the command packet. In FIG. 10, (1), (2), (3) and (4) respectively show the packets of the type 1, 2, 3 and 4.

FIGS. 11A to 11C and FIG. 12 are flow charts indicating the procedures of command analyzing task and idle task of the control unit CPU in the PABX1. In the following there will be given an explanation on the command analyzing task while making reference to the above-mentioned drawings as well as to FIG. 10. The command analyzing sequence shown in FIGS. 11A to 11C performs the interruption by the entry of a command packet into the input command register 706 of the PABX1.

It is assumed that the auxiliary memory 704 does not store the image information. At the start of power supply, the control unit CPU of the PABX1 executes the idel task shown in FIG. 12. Because of the absence of an image file in the auxiliary memory 704 in a step 12-1, the program proceeds to a step 12-9 to transmit a command packet of type 1, for asking the presence of a request for reception or sending, to each terminal unit as explained in the foregoing.

The command analyzing task is initiated upon returning of the command of said type 1 to the PABX1. Upon identification the type 1 command in a step 1, the program proceeds to a step 2. If a request for sending from a terminal unit is present at the 31st bit, the program proceeds to a step 3 to release a command of type 2. The requesting terminal unit returns said command to the PABX1 after incorporating the data indicating the distination, number of transmissions, image size and whether the information is secret. The 31st and 32nd "continued packet" bits are provided for indicating the necessity of sending other destinations by other command packets of type 2 in case same information is to be transmitted to plural terminal units. In case the 15th and 16th bits are set indicating that the information is secret, the PABX1 stores the entered image information with a file number in the auxiliary memory 704, and never transmits said information to the destination terminal unit until the reception is requested from said terminal unit by said file number.

Upon entry of the command packet of type 2 in a step 4, the program proceeds to a step 5 to set an index in the data memory 709, to register the sending unit, destination unit, number of transmissions, image size, classification as secret information, and time of registration, and temporarily stores the image information into the page memory 702 if succeeding packet is not present (step 7). In case the classification as secret information is thereafter identified in a step 8, the PABX generates a file number in a step 9 and stores, in a step 10, the index in the data memory 709 and the content of the page memory 702 into the auxiliary memory 704. If the information is not classified as secret, the PABX1 generates a command packet of type 3 to the destination shown in the index to ask, by the 29th bit of said packet, if the destination unit is available for reception (step 11).

Upon reception of said command packet of type 3 by the PABX1 in a step 15, the program proceeds to a step 16, and, since the 29th bit is already set for asking whether the destination unit is available for reception, a step 17 is executed to identify whether the 32nd response bit is set. If said response bit is not set for any destination, indicating the unavailability of said destination unit for reception, the program proceeds to a step 18 for creating, in the auxiliary memory 704, a new file including the index of such unavailable destination unit and the content of the page memory 702. Such occupied terminal unit answers the waiting time in the 15th–18th bits, and said waiting time is added to the content of the index. Thereafter the program proceeds to a step 20.

On the other hand, if the response bit is set, a step 19 is executed to set a flag corresponding to such destination.

A succeeding step 20 identifies whether the command packet of type 3 is to be transmitted to other terminal units, and, if affirmative, the program returns to the step 11 for transmitting the command packet of type 3 to such other terminal units. On the other hand, if such transmission is no longer required, the program proceeds to a step 21 to identify whether the ready flags are set corresponding to all the destinations designated by the sending unit. If the ready flag is not yet set for any destination unit, a step 22 is executed to store the index of such destination on the data memory 709 and the image information in the page memory 702 into the auxiliary memory 704, and the program proceeds to a step 23. On the other hand, if the ready flags are set for all the appointed destinations, the program immediately proceeds to the step 23.

The step 23 releases a command packet of type 3, with the 30th bit set for asking the completion of stand-by procedure, to the destinations units available for reception.

Upon returning of said command paket to the PABX, the program proceeds from a step 24 to a step 25. Upon reception of responses indicating the completion of stand-by procedure from all the available destination units in the step 25, a step 26 is executed to simultaneously transmit, from the page memory 702, the image information to all the destination units for which the ready flags are set.

After the transmission of image information, a step 27 releases, from the PABX1, a command packet of type 3 with the 31st bit set for asking the completion of reception.

Upon returning of said command packet to the PABX1, the program proceeds from a step 28 to a step 29. Upon reception of the responses indicating the completion of reception from all the destination units to which the image information was transmitted, a step 30 is executed to erase the index stored in the data memory 709, and a command packet of type 1 is thereafter sent to all the terminal units according to the idle task shown in FIG. 12. Also if a step 21-4 in said idle task identifies any file in the auxiliary memory 704 for which the waiting time has expired, a step 12-5 loads the index, including the destination and number of transmissions, of such file into the data memory 709, then a step 12-6 loads the image information from the auxiliary memory 704 into the page memory 702, a step 12-8 sends a command packet of type 3 to the destination of the index loaded in said data memory 709, and the image information is transmitted from the page memory 702 after the protocol exchange as explained before.

In such case the data loaded into the data memory 709 and the page memory 702 from the auxiliary memory 704 are erased therefrom in a step 12-7, in order to effectively utilize the capacity of said auxiliary memory.

Also a file classified as secret is released from the auxiliary memory 704 only when a request for reception is received by a command packet of type 1 from the destination, regardless of the waiting time of the destination unit (step 12-2).

In case the waiting time has expired for a file not classified as secret in the auxiliary memory 704, the program proceeds from a step 12-3 to a step 12-8 to erase said file from the auxiliary memory 704, thereby enabling effective use thereof.

As explained in the foregoing, the image information classified as secret is not directly transmitted to the destination but is once stored in the auxiliary memory and is released from the PABX1 only in response to a request for reception from the destination. Consequently the secret information is never transmitted to destinations other than the designated ones nor to unmanned terminal units.

Also in case of image transmission to plural terminal units, all the terminal units need not be simultaneously available for reception, since the image transmission is effected at first for those available for reception while the system stores the addresses of the unavailable terminal units and the image information.

In this manner the terminal units available for reception can receive the transmission on real-time basis, while those not available for reception can receive the transmission after such unavailable state is resolved, without any trouble to the sending unit.

Furthermore, as each unavailable terminal unit advises the period of unavailability as a waiting time to the PABX1, the image transmission can be made on the basis of said waiting time without a new notice, from the unavailable unit to the PABX1, that said unit has now become available for reception.

Figures 1, 11A:
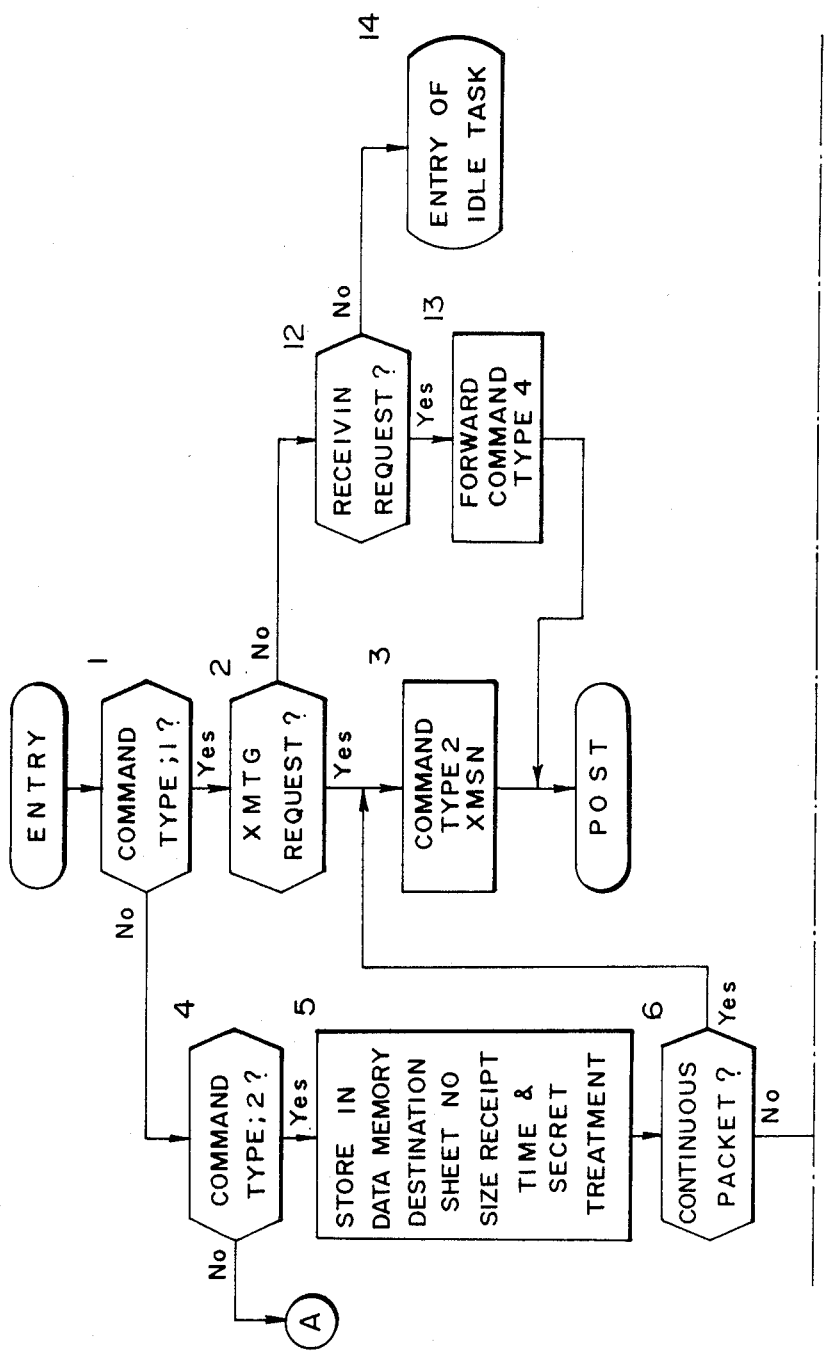
FIG. 11A composed of FIG. 11A-1 and FIG. 11A-2 to FIG. 11C and FIG. 12 are flow charts showing the control sequences of the control unit shown in FIG. 7.

In case a step 12 in FIG. 11A identifies a request for reception from a terminal unit in response the command packet of type 1, a step 13 is executed to sent a command packet of type 4 from the PABX1 to the terminal unit requesting the reception.

There are two types of request for reception, one requesting the transmission of image information stored in the auxiliary memory 704 while the other requesting the transmission of a list of reception log concerning the transmission of image information. The requesting unit indicates the request by the 5th and 6th bits in the command packet of type 4 shown in FIG. 10(4).

Upon returning of said command packet of type 4 to the PABX1, a step 31 is executed to identify, from the state of the 5th and 6th bits of said command packet, whether the terminal unit is requesting a log list or an image transmission. In the former case, a step 32 is executed to extract the files relating to the requesting unit from the auxiliary memory 704, extend the indexes of said files in the data memory 709, further extend the content thereof in the page memory 702 by means of the font memory 708 and transmit thus extended data as an image.

FIG. 15 shows a form of the log list transmitted from the PABX1 and printed by the printing unit. At the left-hand end printed is a file number attached to the signals when they are stored in the auxiliary memory 704, and the sender, secrecy classification, time of entry and image size are printed at right. It is also possible to print a sending log listing the indexes of image information sent from a terminal unit.

After sending the image information including the reception log to the requesting terminal unit, the PABX1 again executes the idle task for generating a command packet of type 1.

In case the terminal unit which has received the reception log finds wishes to receive a file of image information therein, a request for reception is sent to the PABX1 again by the command packet of type 1.

Upon reception of said command packet, the PABX1 again sends a command packet of type 4 to the requesting terminal unit. Upon reception of said command packet of type 4, said terminal unit selects the image information in the auxiliary memory 704 by a corresponding file number to be entered from the control unit 416. Said command packet of type 4 indicates said file number by the 7th to 10th bits and the desired number of receptions by the 11th to 14th bits.

In a step 33, the PABX1 loads the image information corresponding to thus selected file number from the auxiliary memory 704 to the page memory 702, and sends said information of a desired number from the page memory 702 to the requesting terminal unit.

As explained in the foregoing, the sending terminal unit is capable of sending the image information regardless whether the destination unit is available for reception, and, if it is not available, the information is stored in a memory of the PABX for a determined period. Each terminal unit can receive a list of stored information addressed thereto, and can therefore make accesses to the PABX1 for receiving necessary information at necessary timings.

Figure 13:
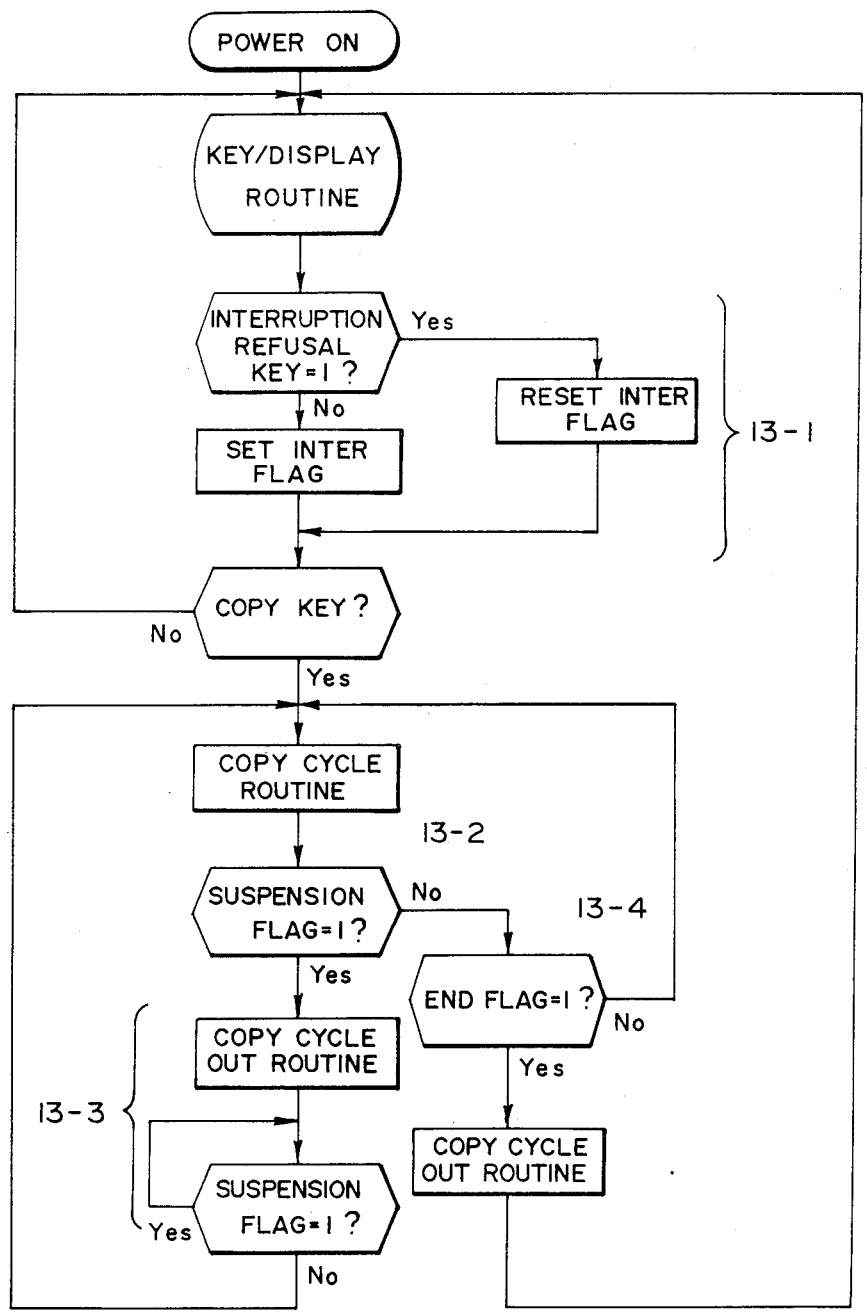
FIGS. 13 and 14 are flow charts showing the control sequences of the terminal unit.
Figure 14:
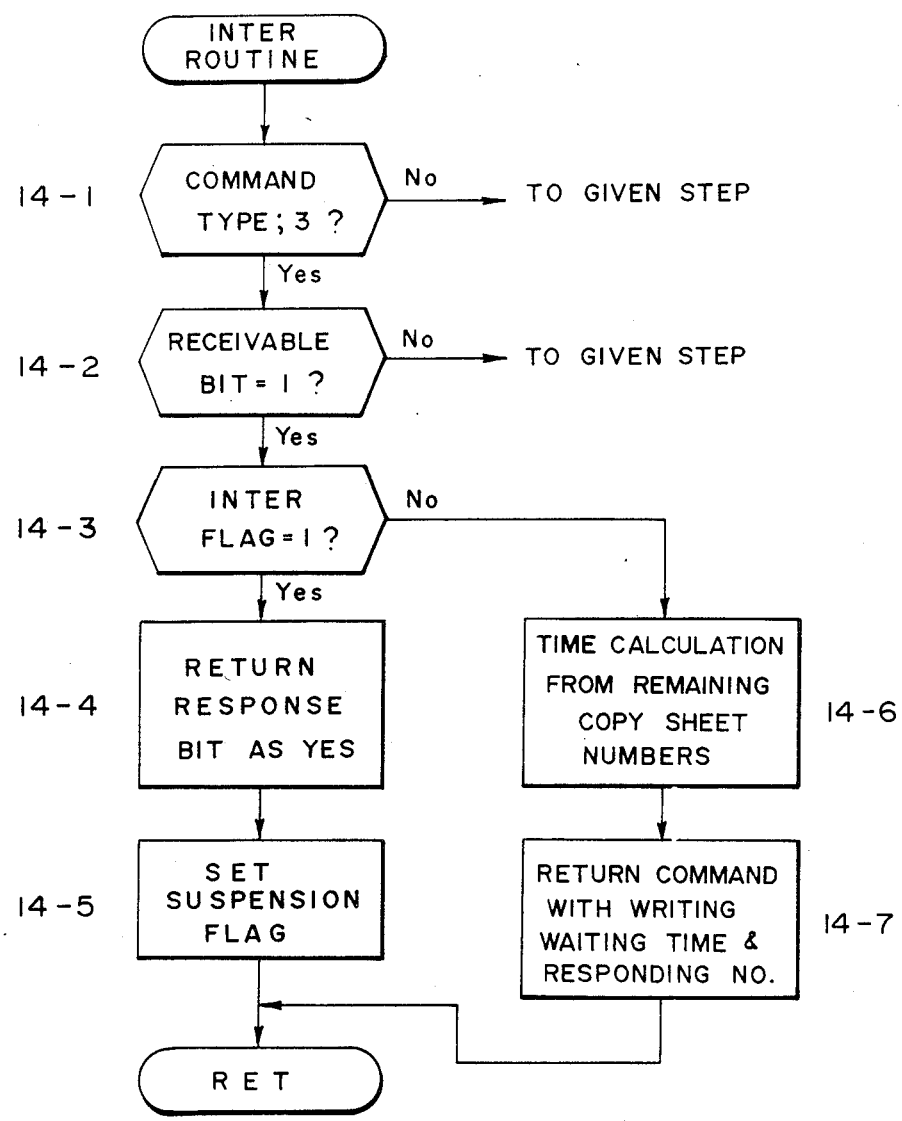

Also as explained in the foregoing, the combination of the reading unit R1 and printing unit P1 or of the reading unit R2 and printing unit P2 shown in FIG. 7 is capable of the local copying operation independently from the PABX1. FIGS. 13 and 14 show flow charts for controlling the operation of the terminal unit.

The control unit 416 is provided with a selector button for selecting one of two modes, in case a command packet of type 3 is sent from the PABX1 during the local copying mode, whether to enable the reception of image transmitted from the PABX1 by interrupting said local copying operation, or to reject such interruption and to incorporate the waiting time into said command packet of type 3. At the start of power supply, the reading/printing unit executes a key sensing routine independently from the PABX1 to read the interruption refusing flag and accordingly sets or resets a flag enabling the interruption (step 13-1 in FIG. 13).

Upon reception of a command packet from the PABX1, the terminal unit executes a command analyzing routine shown in FIG. 14. In case said command packet is of type 3, the program proceeds from the step 14-1 to a step 14-2 to identify, from the 31st bit of said packet, whether the packet is asking the availability of the terminal unit for reception, and, if affirmative, the program proceeds to a step 14-3 for identifying whether the interruption enabling flag has been set by the aforementioned key sensing routine. If said flag has been set, a step 14-4 is executed to release the command packet, with the 32nd bit in set state, to the PABX1. Thereafter a step 14-5 sets an interruption flag.

On the other hand, if the interruption enabling flag has not been set, a step 14-6 calculates the time required for the completion of the copying operation already in execution from the number of remaining copies, and sends the command packet of type 3 to the PABX1 after setting said waiting time in the 15th to 18th bits but without setting the 32nd bit.

Thereafter the aforementioned control procedure of the PABX1 is executed.

In case the interruption enabling flag is set and the interruption flag is set in the step 14-5, a step 13-2 in FIG. 13 read said interruption flag at the completion of each local copying cycle, whereby the program proceeds to a step 13-3 to interrupt the succeeding copying cycle and to await the resetting of said interruption flag. The local copying is restarted after said resetting. Said interruption flag is reset at the completion of reception of the image received by such interruption procedure.

On the other hand, if the interruption flag has not been set, a step 13-4 identifies an end flag. Said end flag is set at the completion of a local copying operation, and the copying cycle is repeated until said end flag is set. Upon said setting a copy cycle out routine is executed and the apparatus returns to the initial state.

As explained in the foregoing, each terminal unit is capable of selecting whether or not to accept the interruption from the PABX1 during the local copying operation, so that the performance of the terminal unit can be adjusted according to the state of utilization. Also even if the interruption is not accepted, there will be no inconvenience since the image information to be transmitted can be stored in the auxiliary memory 704 in the PABX1.

What I claim is:

1. An image transmission system comprising:
one or more image output means;
one or more image recording means;
relaying means for transmitting image information entered from said output means to selected one or ones of said recording means; and
memory means for storing image information;
wherein said selected recording means, if not available for receiving said image information, advises the period of said unavailability, and said relaying means is adapted to store the image information to be transmitted in said memory means and to send said image information to said recording means after the lapse of said period of unavailability.

2. An image transmission system according to claim 1, wherein said recording means is adapted to advise said relaying means of the period required for the completion of a recording operation already in progress.

3. An image transmission system according to claim 1, wherein said relaying means sends a request for transmission of image information to said selected recording means after the lapse of said period of unavailability.

4. An image transmission system comprising:
image information output means;
image recording means for image recording according to image information;
means for receiving image information from an external apparatus; and
mode selecting means for selecting either a first mode for enabling image recording according to image information from said receiving means while interrupting an image recording according to image information from said output means, or a second mode for disabling such image recording according to image information from said receiving means.

5. An image transmission system according to claim 4, wherein said output means is adapted to photoelectrically reading an origianl image, and said recording means is adapted for image recording on a recording material.

6. An image transmission system according to claim 4, wherein said recording means is adapted to advise the period required to complete a recording operation in progress to said external apparatus in case said second mode is selected.

7. An image transmission system comprising:
a plurality of image processing means each adapted for processing image data;
relaying means having a plurality of data transmission lines and connected to said plurality of image processing means through said plurality of data transmission lines, said relaying means being adapted to transmit image data received from any one of said image processing means through an associated one of said data transmission lines to at least one other of said image processing means through an associated one of said data transmission lines; and memory means provided at said relaying means for storing log data relating to the image data transmission performed between said plurality of image processing means through said relaying means.

8. A system according to claim 7, further comprising control means for causing the log data stored in said memory means to be read out in accordance with a request from any one of said plurality of image processing means, and then transmitted through an associated one of said transmission to lines the one of said image processing means which made the request.

9. A system according to claim 8, wherein said control means is adapted to cause selective read-out from said memory means of log data relating only to said one image processing means.

10. A system according to claim 8, wherein said memory means is arranged to store the log data in coded form, said system further comprising means for converting the coded log data read out from said memory means into a data form processible by said image processing means, and wherein the converted log data is transmitted to said one image processing means.

11. A system according to claim 7, wherein each of said plurality of image processing means includes one of (1) reading means for reading an original document to produce image data and transmitting the image data, and (2) recording means for recording an image based on received image data.

12. An image transmission system comprising:
a plurality of image processing means each adapted for processing image data; and
relaying means having a plurality of data transmission lines and connected to said plurality of image processing means through said data transmission lines, said relaying means being adapted to transmit image data received from any one of said image processing means through an associated one of said data transmission lines to at least one other of said image processing means through an associated one of said data transmission lines,
wherein said relaying means is adapted to send a specific command signal to one after another of said image processing means, and each of said image processing means is able to transmit or receive the image data to or from at least one other of said image processing means responsive to receiving the command signal, and wherein each of said image processing means is adapted to transmit to said relaying means a second command signal indicating that the image processing means requires to transmit or receive image data, if such requirement exists, when the respective image processing means in question receives the command signal from said relaying means, the command signals being selected by said relaying means from among a plurality of predetermined types of command signals.

13. A system according to claim 12, wherein said relaying means is adapted to send the command signal, if the one of said image processing means which has received the command signal does not perform an image data transmission or receiving operation, to another of said image processing means.

14. A system according to claim 12, wherein each of said plurality of image processing means includes one of (1) reading means for reading an original document to produce image data and transmitting the image data, (2) recording means for recording an image based on the image data received.

15. An image transmission system comprising: p0 a plurality of image processing means each adapted for processing image data;
relaying means having a plurality of data transmission lines and connected to said image processing means through said data transmission lines, said relaying means being adapted to transmit image data received from any one of said image processing means through an associated one of said data transmission lines to other ones of said image processing means through respective associated ones of said data transmission lines; and
memory means provided at said relaying means for storing the received image data,
wherein said relaying means is adapted, if at least one of said image processing means to which the image data is to be transmitted from said relaying means is not able to perform image data processing, to transmit the image data to one or ones of said image processing means which are capable of processing the image data and to cause said memory means to store the same image data, and then to transmit the image data stored in said memory means to said one image processing means when said one image processing means is again able to process the image data.

16. A system according to claim 15, wherein said relay means is adapted, prior to transmission of the image data, to identify, as to each of the plural image processing means to which the image data is to be transmitted, whether that image processing means is able to process the image data.

17. A system according to claim 15, wherein said relaying means is adapted, after the image data stored in said memory means is transmitted to the one of said image processing means which is no longer unable to process the image data, to erase the image data from said memory means.

18. A system according to claim 15, wherein said relaying means is adapted to simultaneously transmit the received image data to the plural image processing means capable of processing the image data.

19. A system according to claim 15, wherein each of said plurality of image processing means includes one of (1) reading means for reading an original document to produce image data and transmitting the image data, and (2) recording means for recording an image based on the image data received.

20. An image transmission system comprising:
a plurality of image processing means each adapted for processing image data;
relaying means having a plurality of data transmission lines and connected to said plurality of image processing means through said plurality of data transmission lines, said relaying means being adapted to transmit image data received from any one of said image processing means through an associated one of said data transmission lines to at least one other of said image processing means through an associated one of said data transmission lines; and a memory means provided at said relaying means for storing the received image data, wherein if said one image processing means to which the image data is to be transmitted from said relaying means is not able to perform image data processing, said one image processing means informs said relaying means of a time period during which said one image processing means will be unable to process image data, and wherein said relaying means is adapted to cause said memory means to store the image data responsive to being informed by said one image processing means of the time period, and then to transmit the image data stored in said memory means to said one image processing means, after the lapse of the time period.

21. A system according to claim 20, wherein said relaying means includes address storage means for storing address data indicating the one or ones of said image processing means to which the image data stored in said memory means are to be transmitted, and wherein said relaying means transmits the data stored in said memory means to said one or ones of said image processing means based on the address data stored in said address storage means.

22. A system according to claim 20, wherein said memory means stores compression-processed image data.

23. A system according to claim 20, wherein each of said plurality of image processing means include one of (1) means for reading an original document to produce image data and transmitting image data, and (2) recording means for recording an image based on the image data received.

* * * * *

UNITED STATES PATENT AND TRADEMARK OFFICE
CERTIFICATE OF CORRECTION

PATENT NO. : 4,573,083  
DATED : February 25, 1986  
INVENTOR(S) : KATSUICHI SHIMIZU Page 1 of 3

It is certified that error appears in the above-identified patent and that said Letters Patent is hereby corrected as shown below:

Sheet 9 of 18, FIG. 10(2), change "THE NUNBER" to --THE NUMBER--.

Sheet 9 of 18, FIG. 10(3),    "    "    "    "    "    "

Sheet 10 of 18, FIG. 11A-2, change "SHEETNO," to --SHEET NO,--

Sheet 10 of 18, FIG. 11A-2, change "TIPE3, to --TYPE 3,--

Sheet 10 of 18, FIG. 11A-2, change "MAMORY" to --MEMORY--.

Sheet 11 of 18, FIG. 11A-1, change "RECEIVIN" to --RECEIVING--.

Sheet 12 of 18, FIG. 11B-2, change "REGADING" to --REGARDING--.

Sheet 12 of 18, FIG. 11B-2, change "HVING" to --HAVING--.

Sheet 13 of 18, FIG. 11B-1, change "INDES" to --INDEX--.

Sheet 14 of 18, FIG. 11C, change "MAMORY" to --MEMORY--.

Figure 12:
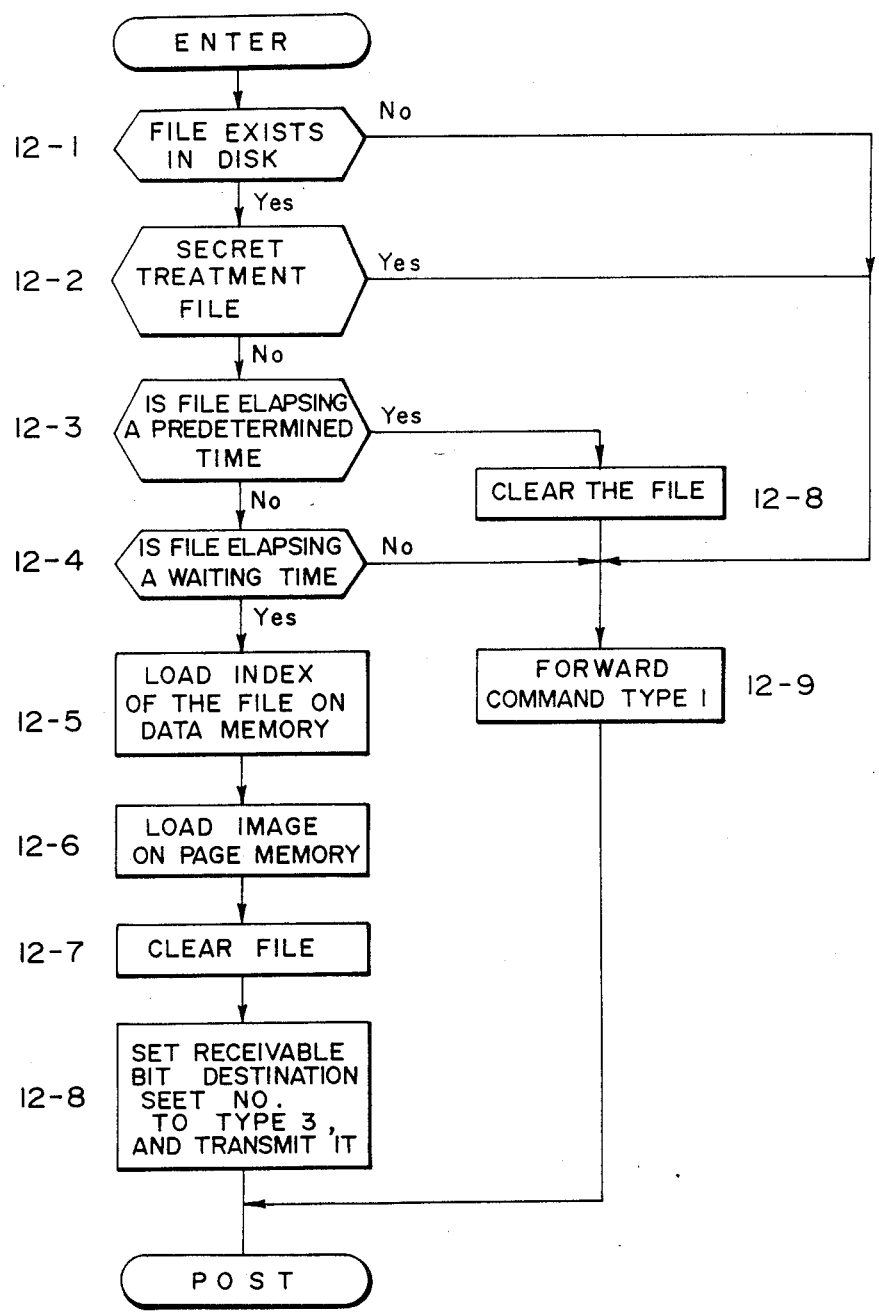

Sheet 15 of 18, FIG. 12, change "SEET" to --SHEET--.

Col. 1, lines 47-8, Change "manner await" to --manner as to await--.

Col. 3, lines 51-2, change "FIG. 11A composed of FIG. 11A-1 and FIG. 11A-2/to FIG. 11C" to --FIG. 11A, composed of FIG. 11A-1 and FIG. 11A-2, FIG. 11B, FIG. 11C,--.

Col. 4, line 8, change "be hereinafter" to --hereinafter be--.

Col. 4, line 10, change "functions" to --function--.

Col. 4, line 55, change "rodshaped" to --rod-shaped--.

Col. 5, line 52, change "entier" to --entire--.

Col. 7, line 14, change "of 2 bits" to --of 32 bits--.

Col. 8, line 46, change "netword" to --network--.

Col. 9, line 53, change "asking the" to --asking about the--.

UNITED STATES PATENT AND TRADEMARK OFFICE
CERTIFICATE OF CORRECTION

PATENT NO. : 4,573,083

DATED : February 25, 1986

INVENTOR(S) : KATSUICHI SHIMIZU

It is certified that error appears in the above-identified patent and that said Letters Patent is hereby corrected as shown below:

Col. 9, line 65, change "packets, and" to --packets or signals, and--.

Col. 10, line 14, change "idel" to --idle--.

Col. 10, line 17, change "for asking the" to --for asking about the--.

Col. 10, line 28, change "distination," to --destination,--.

Col. 10, line 32, change "in case same" to --in the case that the same--.

Col. 10, line 36, change "and never transmits" to --and does not transmit--.

Col. 11, line 24, change "destinations" to --destination--.

Col. 11, line 26, change "paket" to --packet--.

Col. 12, line 3, change "foregoing, the image" to --foregoing, image--.

Col. 12, line 9, change "never" to --not--.

Col. 12, line 28, change "In case a" to --In the case that a--.

Col. 12, line 30, change "sent" to --send--.

Col. 12, line 49, change "transmit thus extended" to --transmit the thus-extended--.

Col. 12, line 53, change "printed is" to --is printed--.

Col. 12, line 56, change "at right" to --at the right--.

Col. 12, line 64, delete "finds".

Col. 12, line 63, change "case" to --the case that--.

Col. 13, line 29, change "in case" to --the case that--.

UNITED STATES PATENT AND TRADEMARK OFFICE
CERTIFICATE OF CORRECTION

PATENT NO. : 4,573,083

DATED : February 25, 1986

INVENTOR(S) : KATSUICHI SHIMIZU

It is certified that error appears in the above-identified patent and that said Letters Patent is hereby corrected as shown below:

```
Col. 13, line 42, change "In case" to --In the case that--.
Col. 13, line 64, change "read" to --reads--.
Col. 16, line 9, change "comprising:  p0 a" to
                          --comprising:
                                       a--.
```

Signed and Sealed this

Twenty-third Day of December, 1986

Attest:

DONALD J. QUIGG

Attesting Officer     Commissioner of Patents and Trademarks